July 28, 1925.                                                    1,547,910
E. T. FERNGREN
METHOD AND APPARATUS FOR DRAWING SHEET GLASS
Filed May 26, 1922           2 Sheets-Sheet 1
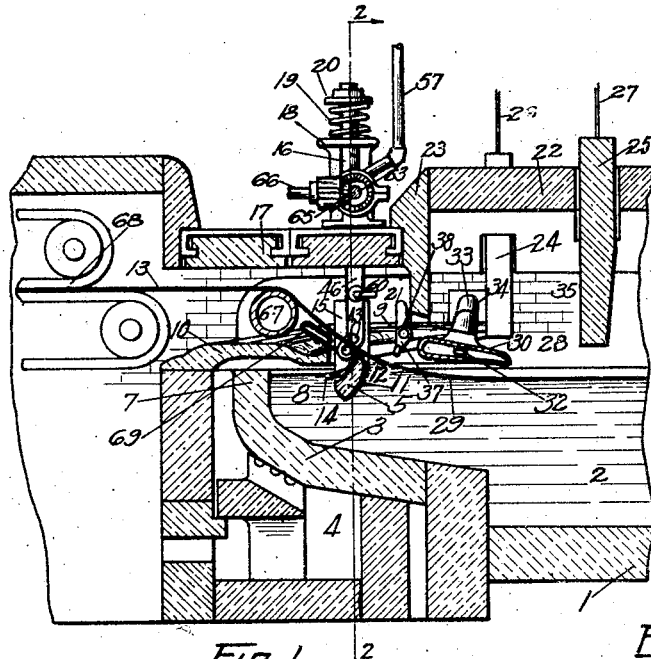
Fig.1
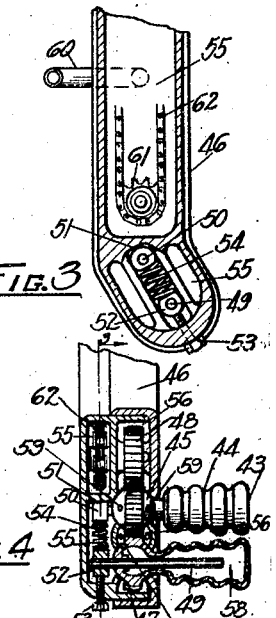
Fig.3
Fig.4
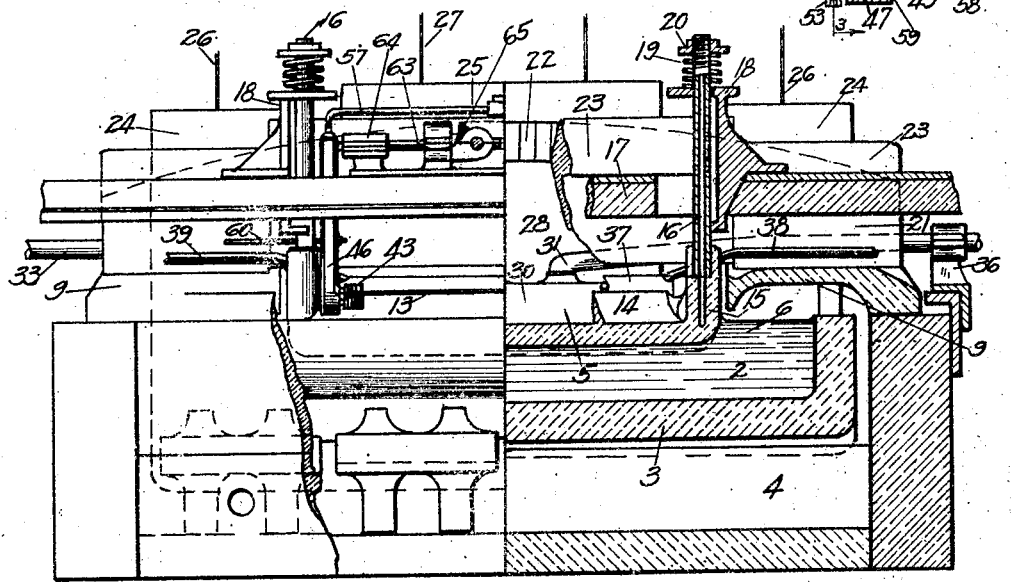
Fig.2
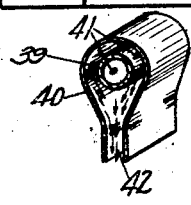
Fig.5
INVENTOR
Enoch T. Ferngren
By C. A. Rowley
ATTORNEY July 28, 1925.

E. T. FERNGREN

METHOD AND APPARATUS FOR DRAWING SHEET GLASS

Filed May 26, 1922 2 Sheets-Sheet 2

INVENTOR
Enoch T. Ferngren
By C. A. Rowley
ATTORNEY

Patented July 28, 1925.

1,547,910

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR DRAWING SHEET GLASS.

Application filed May 26, 1922. Serial No. 563,754.

*To all whom it may concern:*

Be it known that I, ENOCH T. FERNGREN, a citizen of Sweden, residing at Toledo, in the county of Lucas and State of Ohio, have invented new and useful Improvements in Methods and Apparatus for Drawing Sheet Glass, of which the following is a specification.

This invention relates to a new and improved method and apparatus for drawing sheet glass.

In general, the invention involves progressively congealing a surface layer of semi-plastic glass on the upper surface of a body of hot molten glass, and then floating or sliding off this surface layer in a substantially horizontal direction and drawing or stretching it into sheet form before it becomes entirely cold and set.

Incidental to the above main object, the invention employs certain new forms of cooling devices, and a new system of maintaining a circulation in the reservoir of molten glass, to prevent stagnation and devitrification at the end remote from the source of supply.

Other objects of the invention will become apparent from the detailed description of two types of apparatus adapted to carry out the principles of this invention.

In the accompanying drawings:

Fig. 1 is a vertical longitudinal central section through the main portions of one form of the sheet drawing apparatus.

Fig. 2 is a view taken at right angles to Fig. 1, the view being partly in vertical section on substantially the line 2—2 of Fig. 1, and partly in elevation, many of the parts being broken away to facilitate the disclosure.

Fig. 3 is a longitudinal section on line 3—3 of Fig. 4, through a portion of the operating mechanism for the edge cooling rollers.

Fig. 4 is a section through these edge cooling rollers and a portion of the adjacent operating mechanism.

Fig. 5 is a sectional perspective view through a portion of one of the cooling devices.

Figures 6, 7:
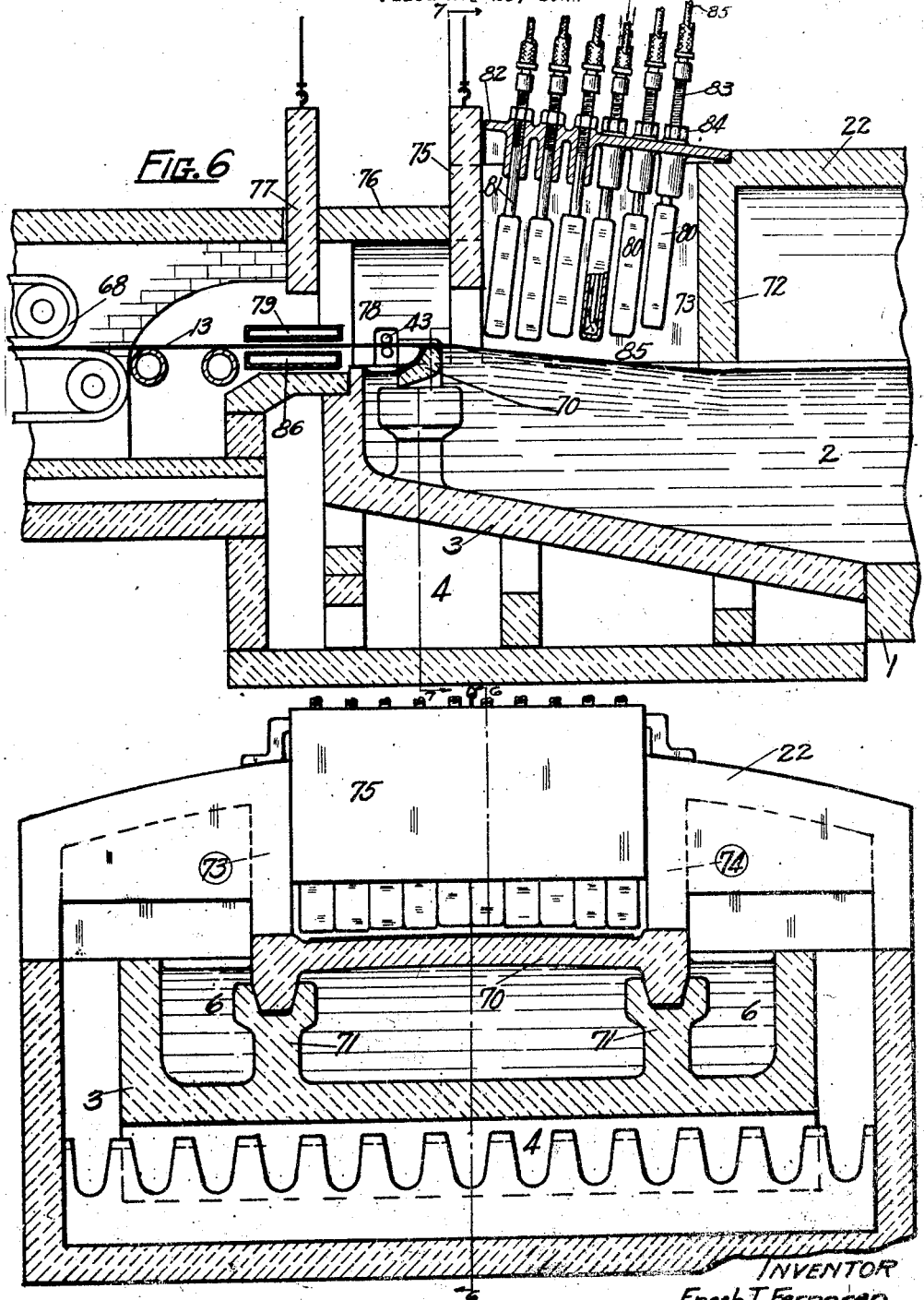
Fig. 6 is a longitudinal section, similar to Fig. 1, through a modified form of the apparatus. The section is taken substantially on the line 6—6 of Fig. 7.
Fig. 7 is a transverse vertical section, taken substantially on the line 7—7 of Fig. 6.

Referring first to the form of the apparatus shown in Figs. 1 to 5 of the drawings, the end of the supply reservoir for the molten glass is shown at 1. This is preferably the discharge end of a continuous tank furnace, the molten glass 2 flowing in from the right in Fig. 1 to the drawing apparatus disclosed in this view. The closed end of the supply tank 3 is made somewhat shallower than the main portion of the tank, and a supporting and heating chamber 4 surrounds this closed end of the tank. Suitably arranged burners within this chamber 4 maintain the glass at the closed end of the tank at the proper temperature. The usual practice in sheet-drawing systems is to allow the whole mass of molten glass to cool to a rather viscous and semi-plastic condition before the sheet is drawn therefrom. In the present system, on the contrary, the main pool or reservoir of molten glass is maintained in a highly heated fluid condition, and a cooling means is applied locally to a portion of the surface of the pool, and the surface layer thus congealed is floated or drawn off from the underlying fluid glass as hereinafter described.

A refractory dam member 5 is suspended in a partly immersed position within the molten glass, so that the upper edge thereof forms an elevated ridge over which the sheet glass is pulled or floated when drawn from the molten mass of glass 2. The length of this dam is less than the width of the tank or reservoir of molten glass, so that side passages or streams of molten glass 6 are left at either end of the dam. The dam is also spaced from the end wall 7 of the tank a distance about equal to the width of the passages 6, so as to leave a body of molten glass 8 between the front face of the dam and the end of the tank. This body of glass 8 connects with the side streams of glass 6 at the two end corners of the tank. Cover tiles 9 and 10 extend over the bodies of glass 6 and 8 to keep these masses of glass at the proper temperature.

The rear face 11 of the dam 5 is preferably somewhat convex, and substantially vertical, and the molten glass is banked up against this face, as at 12, when the sheet of glass 13 is drawn thereover, as will be hereinafter described. The front face 14 of the member 5 is preferably somewhat concave, and such of the fluid glass as is drawn over the dam, beneath the sheet 13, flows down this face 14 into the pool 8 of molten glass in front of the dam. The dam 5 has upturned extensions 15 at its ends, which are hung from supporting rods 16, extending out through the top of the housing 17, and through supporting brackets 18. Springs 19 surround the rods 16 between the supporting brackets 18 and nuts 20 screwed on the ends of the rods. In this manner the dam is yieldably supported or floated in the pool of molten glass, and may yield somewhat and adjust its position under unusual strains when the sheet of glass is drawn thereover.

The housing or roof member 17 extends above the dam 5, and the adjacent portions of the tank and drawing mechanism, but the sides of this housing are open to the air as shown at 21.

The main body of the tank or reservoir 1, is arched over as shown at 22, and the front of this portion of the chamber is closed by a vertical cross-slab 23 which bridges the space between the roof 17 and the arch 22, and extends down to the tops of the side cover-tiles 9.

Adjustably suspended at the sides through the arched roof 22 are a pair of shear-cakes or slabs 24, of refractory material, spaced some little distance behind the slab 23; and somewhat further back in the chamber is a central hanging slab 25 of approximately the width of the dam 5, or the sheet of glass drawn thereover. These slabs 24 and 25 are suspended from cables 26 and 27 so that their distance above the pool of molten glass may be regulated as found desirable.

Between the slab 23 and the slabs 24 and 25 is defined a somewhat irregular cooling chamber 28, cut off in a measure from the heat of the main portion of the furnace by the slabs 24 and 25, and within this chamber 28 are located the cooling devices for congealing a surface layer of viscous semi-plastic glass as at 29 upon the surface of the molten pool 2.

The major cooling element may take a variety of forms, but is shown at 30 in Fig. 1 as a water-cooler having a rather extensive horizontal lower surface positioned substantially parallel to, and adjacent, the upper surface of the pool of glass. The water flows in through one of the supporting pipes 31, which have extensions 32 within the main body of the cooler so that the water will be discharged at points adjacent each end thereof, and the water draws out through the other supporting pipe 33. The supporting pipes 31 and 33 extend out through openings 34 in the side-walls 35 of the arched housing 22, and are supported in suitable pedestals 36. A circulation of cold water is maintained through the cooler, and this water absorbs a considerable amount of the heat from the upper surface portions of the molten glass that flows or is drawn beneath the cooler.

A second, positive, air-cooler 37 is arranged just ahead of the cooler 30, and between this cooler 30 and the dam 5. A section of this cooler is shown in Fig. 5. Air under pressure is fed in through one or both of the supporting pipes 38 and 39, these pipes continuing inside of the housing 40, and having a number of spaced outlet holes 41 through which the air blows out to the interior of the housing. Housing 40 has a bottom slot 42 through which this cooling air will be directed in an even stream or sheet against the congealing surface sheet of glass as it is drawn beneath the cooler, in a manner presently to be described.

In addition to the above, edge cooling and tensioning elements are used as shown in Figs. 1 and 2, and in detail in Figs. 3 and 4. Each edge of the sheet 13, after it is pulled over the dam 5, passes between a pair of internally water-cooled rollers 43. These rollers have their faces grooved as shown at 44, and each roller is in the form of the frustum of a cone, the narrower end being at the outer edge of the sheet, as shown in Fig. 4. In this way a more secure grip is obtained on the sheet edge portions. The inner end of each roller 43 has formed thereon a spherical bearing surface 45, which is journaled in a spherical seat or bearing in the supporting casing 46. A gear 47 is also formed about the outer surface of spherical bearing 45. The two gears 47 mesh with one another, and a driving gear 48 meshes with the upper gear 47, so that the two rollers are driven in unison but in opposite directions. Each roller 43 is hollow and a pipe 49, open at both ends leads in through the rear end of the roller, as shown in Fig. 4, and terminates near the outer end of the roller. On the projecting exposed end of the upper pipe 49 is mounted a bearing block 50 which normally contacts with a partition 51 within the casing 46. On the corresponding end of the lower pipe 49 is mounted a similar bearing block 52, which normally bears against an adjusting screw 53, and an expansion spring 54 is seated between the two bearing blocks 50 and 52. With this mounting the two rollers 43 are normally held in spaced relation as shown in Fig. 4, but may yield apart, against the spring 54, under unusual stress, and thus allow harder portions of the glass, or foreign substances to pass between them, without injury to the mechanism. A circulation of water is maintained through the rollers, and the operating and supporting members therefor. This water serves the double function of protecting the metal parts from the intense heat of the chamber in which they are located, and also acts as a cooling medium for the edge portions of the sheet. To provide for this water circulation, the casing 46 is divided interiorly into two separate chambers 55 and 56 extending substantially the length of the casing. At the lower end of the casing, the blocks 50 and 52, and spring 54. lie within a portion of the outer chamber 55, whereas the gears 47 and 48 lie in the inner chamber 56. Water flows into chamber 55 through pipe 57 from some outside source of supply. It then flows through pipe 49 to the hollow interior 58 of the rollers from which it emerges through passages 59, adjacent the spherical bearing surfaces 45, into the inner chamber 56, from which the water eventually flows out through exit pipe 60. Mounted within the chamber 55, on the other end of the shaft to which is affixed the gear 48, is a sprocket-wheel 61, driven by sprocket chain 62. The chain 62 runs up through chamber 55 and is carried and driven at the upper end by a similar sprocket (not shown) on the end of a cross-shaft 63, mounted in bearings 64 above the roof 17. Both sets of edge coolers are simultaneously driven from the same shaft 63, and this shaft is driven through bevel gearing 65 from drive-shaft 66. The speed of drive shaft 66 is adjustable so that the speeds of the edge rollers 43 may be varied as desired.

In general, the operation consists in congealing or solidifying a surface layer of rather stiff semi-plastic glass on the surface of the molten pool, as the glass flows or is drawn beneath the cooling elements 30 and 37, and then floating off or drawing off this surface layer in a substantially horizontal direction and stretching it into its final sheet form. The sheet of glass is drawn off over the upper edge of the dam or floater 5, and since the molten glass is somewhat sluggish and tenacious, some of it will be drawn along with the more viscous surface portion and will bank up behind the dam as at 12. As the sheet is drawn over the dam, some of this molten or fluid glass will be drawn over the upper edge or ridge of the dam and flow down into the front pool 8. This fluid glass will serve as a lubricant upon which the sheet is floated over the ridge of the dam. The sheet 13 is then drawn off between the edge rollers 43, and (in the form shown in Figs. 1 to 5) over a cooled supporting roll 67 and through any appropriate form of drawing mechanism 68, which may be of the form shown in the Colburn Patent, No. 1,248,809, granted Dec. 4, 1917. The edge rollers 43 are preferably driven somewhat slower than the drawing mechanism 68. In this way they positively draw the edge portions of the sheet over the dam, and at the same time cool and hold back somewhat on the edges of the sheet to maintain the width during the stretching operation that takes place after the still plastic sheet is drawn over the dam or float 5, and before it becomes set in final sheet form. A cooler 69, preferably of the internally water cooled type, is positioned below the sheet before it reaches the supporting roll 67 and insures the lower surface of the sheet being cooled sufficiently not to stick to the roller, or be marred thereby.

As the molten glass 2 is continually being banked up behind the dam or floater 5, as at 12, during the drawing process, this glass will tend to flow away toward the side portions 6 of the reservoir. Also the fluid glass that passes over the dam, beneath the sheet 13, and into the front channel 8, must flow away toward the sides of the tank. These side flowing streams both in front and behind the dam 5 must flow back along the sides of the tank, gradually joining the forward central flow toward the dam and into the sheet. In this way a continual slow circulation of the molten glass is produced, and stagnation and consequent devitrification of the glass in the front portions of the tank is avoided.

A somewhat modified form of apparatus, embodying much the same principles of operation, is shown in Figs. 6 and 7. In this modification, the tank portions 1 and 3, and the heating chamber 4 are much the same as in the form first described. In this case the dam or float 70 is supported from beneath on a pair of pedestals 71 which project up from the bottom of tank extension 3. Of course the dam might, if desired, be hung from above as in Figs. 1 and 2. It will be noted in Fig. 7 that the dam is arched upwardly somewhat at the center. This is to correspond in a measure with the surface of the glass banked up behind the dam which will tend to flow away toward either side as already described. Preferably the dam 5, in the previously described construction will be arched in a similar manner.

The main portion of the tank is arched over at 22, as in the construction first described. However, a rear partition wall 72, and a pair of side partitions 73 and 74, all hung from above and reaching nearly to the surface of the molten glass 2, define a cooling chamber above the molten glass of approximately the width of the sheet 13 to be drawn from the tank. The front of this chamber is adjustably closed by the hanging gate 75. The extreme forward end of the tank is arched over at 76, and closed in front by a second adjustable hanging gate 77. The temperature of the partially closed chamber 78, formed between the gates 75 and 77, may be regulated as desired, by means of suitable burners within the chamber, or by adjusting the cooler 79 in or out.

The edge cooling rollers 43 may be of the same form shown in Figs. 1 to 4, although their operating and supporting structure has been omitted in Figs. 6 and 7.

The major cooling apparatus, for congealing the surface layer on the molten glass, is in this form of the device composed of a series or bank of separate cooling units 80. Each cooler 80 comprising a metallic casing suspended from a pipe 81 adjustable vertically through a roof plate 82. A portion of the pipe 81 is threaded as at 83, and the position of the adjusting nut 84 above plate 82 regulates the proximity of the lower end of the cooler to the surface of the molten glass. A smaller pipe 85 extends centrally through pipe 81, and nearly to the bottom of cooler 80. Cooling water or other fluid is fed in through pipe 85, and passes out from cooler 80 through pipe 81. As will be evident from the drawings these cooling units 80 are arranged in a series of transverse rows across the sheet, and as the elevation of any single unit can be individually adjusted, the cooling effect on the surface of pool 2 may be regulated as found desirable in all parts of the cooling chamber. In some installations, experience may prove it to be unnecessary to have such a large range of adjustment, and a single transverse cooler may be substituted for a row of transverse coolers, more probably those rows most remote from the dam 70.

The operation of drawing and forming the sheet of glass 13 is much the same as with the apparatus first described. In this case, the sheet is drawn away from dam 70 in a more truly horizontal direction. It passes from edge rollers 43 between the coolers 79 and 86, which quickly set the sheet, and over supporting rollers 87 into the drawing mechanism 68, from which it passes to the annealing leer as in similar installations.

Obviously, the form of cooling apparatus 80 shown in Figs. 6 and 7, could be substituted for the cooling mechanism 30 shown in Figs. 1 to 4, and vice versa. Also the air-cooler 37 may be used in either or both forms of apparatus, as may be found necessary under varying conditions to secure the proper degree of semi-solid plasticity in the surface layer of glass.

In either form of apparatus, a distinct surface layer of semi-solid tenacious glass is congealed upon the surface of a pool of liquid glass, and then this layer is floated or drawn off over a slightly elevated ridge, and drawn away in sheet form. As the sheet is continually drawn away, the congealed surface layer is continually replaced as more molten glass flows under the cooling elements. In this way the operation is continuous. Also this drawing operation, as already described, incidentally causes a continuous circulation of the liquid glass toward and away from the closed end of the tank, thus preventing the accumulation of stagnant glass at any point.

Claims:
1. The process of drawing sheet glass which consists in creating a floating unit of plastic glass on a body of molten glass, and then drawing a sheet of glass from said plastic unit while maintaining the surface portion of the molten body which surrounds the said unit in a highly fluent state.

2. The method of producing sheet glass which consists in congealing a portion of the surface layer on a body of fluid glass to a point of plastic solidity and impelling the glass sheet from this surface layer in a manner to supply one side of the sheet with a coating of the fluid glass.

3. The method of producing sheet glass which consists in congealing a portion of the surface layer on a body of fluid glass in a tank, and floating this surface layer from the liquid glass without contacting the walls of the tank, while maintaining a circulation of the fluid glass within the tank, first forwardly under and with the sheet, and then back between the sides of the tank and the outer edges of the congealed surface layer.

4. The process of drawing a continuous sheet of glass which consists in locally changing the fluidity in the surface stratum of a body of molten glass to a state of plasticity along a predetermined area central of the molten body, applying drawing stress to the plastic stratum to move it and adjacent substratums lengthwise of the body while creating a zone of resistance to said movement transverse of its path, and causing the formation of a slanting elevation to raise the surface stratum above the normal level of its surrounding body while progressively drawing the sheet of glass therefrom.

5. The method of producing sheet glass consisting in congealing a layer or sheet of semi-solid glass on the surface of a pool of molten glass, the sheet being surrounded by fluid glass, and floating this sheet of glass off from the pool horizontally.

6. The method of producing sheet glass consisting in congealing a layer or sheet of semi-solid glass on the surface of a pool of molten glass, floating this sheet of glass horizontally on the fluid glass therebeneath, drawing the sheet away from the pool, and cooling the surfaces of the sheet as they leave the pool.

7. The method of producing sheet glass consisting in congealing a layer or sheet of semi-solid glass on the surface of a pool of molten glass, floating this sheet of glass horizontally on the fluid glass therebeneath, drawing the sheet over an elevated mass of fluid glass near one side of the pool, and cooling the surfaces of the sheet as they leave the pool.

8. In a sheet glass drawing device, the combination of means for causing the progressive formation of a sheet of plastic glass upon a body of fluid glass, means for progressively drawing the said sheet away from the body, and means for causing the building up of a supporting elevation of fluid glass beneath the plastic sheet where it is drawn from the said body.

9. In a sheet glass drawing device, the combination of cooling means for progressively congealing a localized portion of the surface layer of a body of molten glass, and means for drawing away laterally this congealed portion in sheet form.

10. In an apparatus for drawing sheet glass, the combination of means for progressively causing the formation of a sheet of plastic glass upon the surface of a body of molten glass, means for maintaining an elevated ridge of molten glass within the main body of glass, and means for drawing off the sheet of plastic glass over the ridge.

11. In an apparatus for drawing sheet glass, the combination with a tank containing a body of molten glass, of means for progressively causing the formation of a sheet of semi-solid plastic glass upon the surface of the molten glass, a dam or float partially submerged in the molten glass in spaced relation to one end of the tank, and means for causing a stream of molten glass to flow over the dam and simultaneously floating the sheet of plastic glass from the tank on this stream.

12. In an apparatus for drawing sheet glass, a receptacle containing a pool of molten glass, and a dam or floater partly submerged in the molten glass, over which the sheet of glass is drawn laterally from the pool.

13. In an apparatus for drawing sheet glass, a receptacle containing a pool of molten glass, and a dam or floater partly submerged in the molten glass, in spaced relation to the walls of the receptacle, over which the sheet is drawn laterally from the pool.

14. In an apparatus for drawing sheet glass, a receptacle containing a pool of molten glass, and a dam or floater yieldingly suspended in a partly submerged position in the molten glass, over which the sheet of glass is drawn laterally from the pool.

15. An apparatus for drawing sheet glass, comprising a receptacle for a pool of molten glass, a dam or float positioned within the pool of glass, means for congealing a sheet of glass on the surface of the liquid pool, and means for drawing the sheet off horizontally over the dam.

16. An apparatus for drawing sheet glass, comprising a receptacle for molten glass having one end closed and the other end in open communication with a supply of molten glass, a dam or float positioned within the pool of glass in spaced relation to the closed end of the receptacle and projecting somewhat above the normal level of the glass in the receptacle, means for congealing a layer or sheet of semi-solid glass on the surface of the pool, and means for drawing off this sheet horizontally over the dam.

17. In an apparatus for drawing sheet glass, a receptacle containing a mass of molten glass, and a cooler for the surface glass comprising a closely assembled group of separate units each independently adjustable toward and away from the glass surface.

18. In an apparatus for drawing sheet glass, a receptacle containing a mass of molten glass, and a cooler for the surface glass comprising an assembly of separate units independently adjustable toward and away from the glass surface.

19. In an apparatus for drawing sheet glass, a receptacle containing a mass of molten glass, and a cooler for the surface glass comprising a closely assembled group of separate units each independently adjustable toward and away from the glass surface, each unit including means for maintaining a flow of cooling fluid therethrough.

20. In an apparatus for drawing sheet glass, a positive cooler for the sheet, comprising a casing having a slot through which air or similar fluid is directed against the sheet surface, and a perforated supply pipe for the air, positioned within the casing and in spaced relation to the walls thereof.

21. In a sheet of glass drawing apparatus, a sheet edge cooling mechanism, comprising a suspended casing, a pair of sheet edge gripping rollers horizontally pivoted for rocking adjustment at the lower end of the casing, means within the casing for positively rotating the rollers, and means for circulating a cooling fluid through the casing and rollers.

Signed at Toledo, in the county of Lucas and State of Ohio, this 24th day of May, 1922.

ENOCH T. FERNGREN.